(12) United States Patent
Hwang

(10) Patent No.: US 10,488,002 B1
(45) Date of Patent: Nov. 26, 2019

(54) SOLAR GARDEN LIGHT

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 16/238,624

(22) Filed: Jan. 3, 2019

(51) Int. Cl.
| | |
|---|---|
| F21S 8/00 | (2006.01) |
| F21S 8/08 | (2006.01) |
| F21V 21/08 | (2006.01) |
| F21V 21/10 | (2006.01) |
| F21S 9/03 | (2006.01) |
| F21V 7/04 | (2006.01) |
| F21V 23/04 | (2006.01) |
| F21V 14/02 | (2006.01) |
| F21V 21/30 | (2006.01) |
| F21W 131/109 | (2006.01) |
| F21Y 115/10 | (2016.01) |
| F21Y 113/13 | (2016.01) |

(52) U.S. Cl.
CPC ............... *F21S 8/081* (2013.01); *F21S 9/035* (2013.01); *F21V 7/04* (2013.01); *F21V 14/02* (2013.01); *F21V 21/0824* (2013.01); *F21V 21/10* (2013.01); *F21V 21/30* (2013.01); *F21V 23/04* (2013.01); *F21W 2131/109* (2013.01); *F21Y 2113/13* (2016.08); *F21Y 2115/10* (2016.08)

(58) Field of Classification Search
CPC .............. F21Y 2115/10; F21Y 2103/10; F21Y 2103/003; F21S 9/035; F21S 8/081; F21S 9/037; G02B 6/0008
See application file for complete search history.

(56) References Cited

U.S. PATENT DOCUMENTS

| | | | |
|---|---|---|---|
| 8,632,234 B1* | 1/2014 | Lowe ..................... | F21S 8/081 362/153.1 |
| 8,827,512 B1* | 9/2014 | Beadle ................... | F21S 8/083 362/153 |
| 2005/0052883 A1* | 3/2005 | Qi .......................... | A47G 33/06 362/555 |
| 2008/0285299 A1* | 11/2008 | Ip ......................... | F21V 21/0824 362/554 |
| 2012/0113625 A1* | 5/2012 | Werner ................... | F21L 4/08 362/183 |
| 2013/0314906 A1* | 11/2013 | Spinner ................. | F21V 33/008 362/145 |
| 2015/0292696 A1* | 10/2015 | Soofer ................... | F21S 9/035 362/554 |

* cited by examiner

*Primary Examiner* — Gerald J Sufleta, II

(57) ABSTRACT

A solar garden light includes a support member, a lamp head and a solar power supply module above the lamp head. The lamp head has an outer lamp cover. An inner lamp cover is sheathed on the interior of the outer lamp cover, A respective light guide is disposed on the inner peripheries of the lamp covers. First, second, and third LEDs are installed in the inner lamp cover. Light from the first, second, and third LEDs, by way of the light guides, is projected towards the front, rear, and surrounding region of the lamp covers.

10 Claims, 11 Drawing Sheets

SOLAR GARDEN LIGHT

TECHNICAL FIELD

The technical field relates to a solar garden light, and more particularly to the solar garden light including an outer lamp cover and an inner lamp cover, both of the outer lamp cover and an inner lamp cover have a transparent material and a light guide structure, so that the light emitted from first, second, and third LEDs installed in the inner lamp cover can be projected towards the front and rear of the lamp cover and spread to the surrounding of the lamp cover.

BACKGROUND

Light emitting diode (LED) with the energy saving feature, and the light, thin, short and compact design is used widely in all kinds of lighting equipment such as an LED garden light used in gardens, at home, outdoor restaurants, or outdoor leisure venues, and these are examples of the place where you can see the use of LEDs.

However, the LED light source is highly directional and limited by the structural design of being installed on a single side of a circuit board, so that the LED garden light can project light in a single direction only and provide a small illumination range. Whenever another area requires lighting, it is necessary to turn the lamp head of the garden light towards the intended area or install another garden light, and thus the overall outdoor lighting design is limited and a wonderful brilliant lighting effect cannot be provided. In addition, when a solar power supply module is used as the power supply of the garden light, the angular movement of the sun must be taken into consideration to provide a better light collection effect of the solar power supply module.

Therefore, it is a main subject of this disclosure to find a way of projecting the light of a garden in different directions, providing a brilliant diversified lighting effect, and maximizing the light collection effect of the solar power supply module.

SUMMARY

Specifically, this disclosure is directed to a solar garden light comprising a support member, a lamp head mounted on the support member and capable of projecting light towards the front, the rear and the surrounding of the lamp head, and a solar power supply module disposed above the lamp head, wherein the lamp head comprises:

an outer lamp cover and an inner lamp cover sheathed on the interior of the outer lamp cover, and the outer lamp cover and inner lamp cover being made of a wholly translucent material, and having a light guide structure disposed at the inner periphery thereof; the outer lamp cover having an opening formed at the front end thereof to form a first translucent portion, and the rear end being a second translucent portion; the inner lamp cover having a shape corresponding to the shape of the outer lamp cover, and the front end of the inner lamp cover has a lens assembly configured to be corresponsive to the inner periphery of the opening of the outer lamp cover; and the first, second, and third LEDs being installed inside the inner lamp cover and electrically coupled to the solar power supply module, and the light emitted from the first LED passing through the lens assembly and the first translucent portion and projecting towards the front of the lamp head, and the light emitted from the second LED passing through the rear end of the inner lamp cover and the second translucent portion and projecting towards the rear of the lamp head, and the light emitted from the third LED passing through the light guide structure of the inner lamp cover and the light guide structure of the outer lamp cover being spread to the surrounding of the lamp head, and the first, second, and third LEDs being electrically coupled to a driver, and the driver controlling the first, second, and third LEDs to emit light simultaneously or separately.

In an embodiment, the lens assembly comprises a convex lens; the first LED is installed on a moving lamp holder, the moving lamp holder is driven to move by an adjusting assembly having a front end disposed inside the inner lamp cover and a rear end extending and protruding out from the rear of the inner lamp cover and the outer lamp cover, and an adjusting knob is exposed from the outer lamp cover and provided for a user to operate, and the adjusting knob is capable of rotating the adjusting assembly, so that the adjusting assembly drives the first LED disposed on the moving lamp holder to move forward and backward with respect to the convex lens, and the focal length of the light emitted from the first LED and passing through the convex lens can be changed Compared with the prior art, this disclosure has the following advantages:

1. The lamp head is capable of projecting light towards the front and the rear of the lamp cover and adjusting the focal length of the projected light to provide a diversified lighting effect.

2. The lamp head has the outer lamp cover and the inner lamp cover, and both of the outer lamp cover and the inner lamp cover are made of a translucent material and have a light guide structure, so that the light emitted from the third LED and can be passed through the light guide structures of the outer lamp cover and the inner lamp cover and spread to the surrounding of the lamp cover to achieve a multidirectional projection and a brilliant lighting effect.

3. The lamp head is capable of adjusting a deflection angle with respect to the support rod according to user requirements to improve the convenience of use.

4. The solar power supply module is capable of adjusting its angle with respect to the support rod, so that the solar power supply module has a better light collection effect.

The above and other objects, features and advantages of this disclosure will become apparent from the following detailed description taken with the accompanying drawings.

DESCRIPTION OF THE PREFERRED EMBODIMENTS

Figure 1:
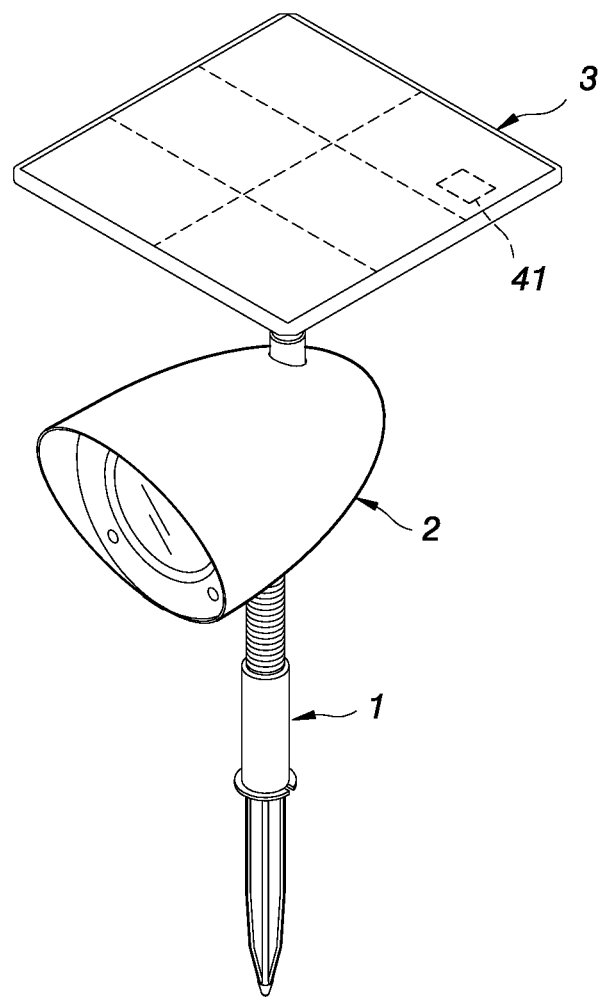
FIG. 1 is a perspective view in accordance with a first embodiment of this disclosure.

The technical content of this disclosure will become apparent with the detailed description of preferred embodiments and the illustration of related drawings as follows With reference to FIGS. 1 and 2 for a solar garden light of this disclosure, the solar garden light comprises a support member 1, a lamp head 2 mounted onto the support member 1, and a solar power supply module 3 disposed above the lamp head 2.

The lamp head 2 is capable of projecting light towards the front, the rear, and the surrounding of the lamp head 2. The lamp head 2 comprises an outer lamp cover 10, an inner lamp cover 20, a first LED 31, a second LED 32, a third LED 33, and a driver 40.

The inner lamp cover 20 is sheathe onto the interior of the outer lamp cover 10, and the outer lamp cover 10 and the inner lamp cover 20 are made of a wholly translucent material, and the inner periphery of the outer lamp cover 10 and the inner periphery of the inner lamp cover 20 have a light guide structure 1, 21 separately, wherein the light guide structures 11, 21 are continuously jagged uneven surfaces. In FIGS. 1 and 2, the outer lamp cover 10 and the inner lamp cover 20 are drawn to be non-transparent, but they are actually made of the wholly transparent material.

Figure 3:
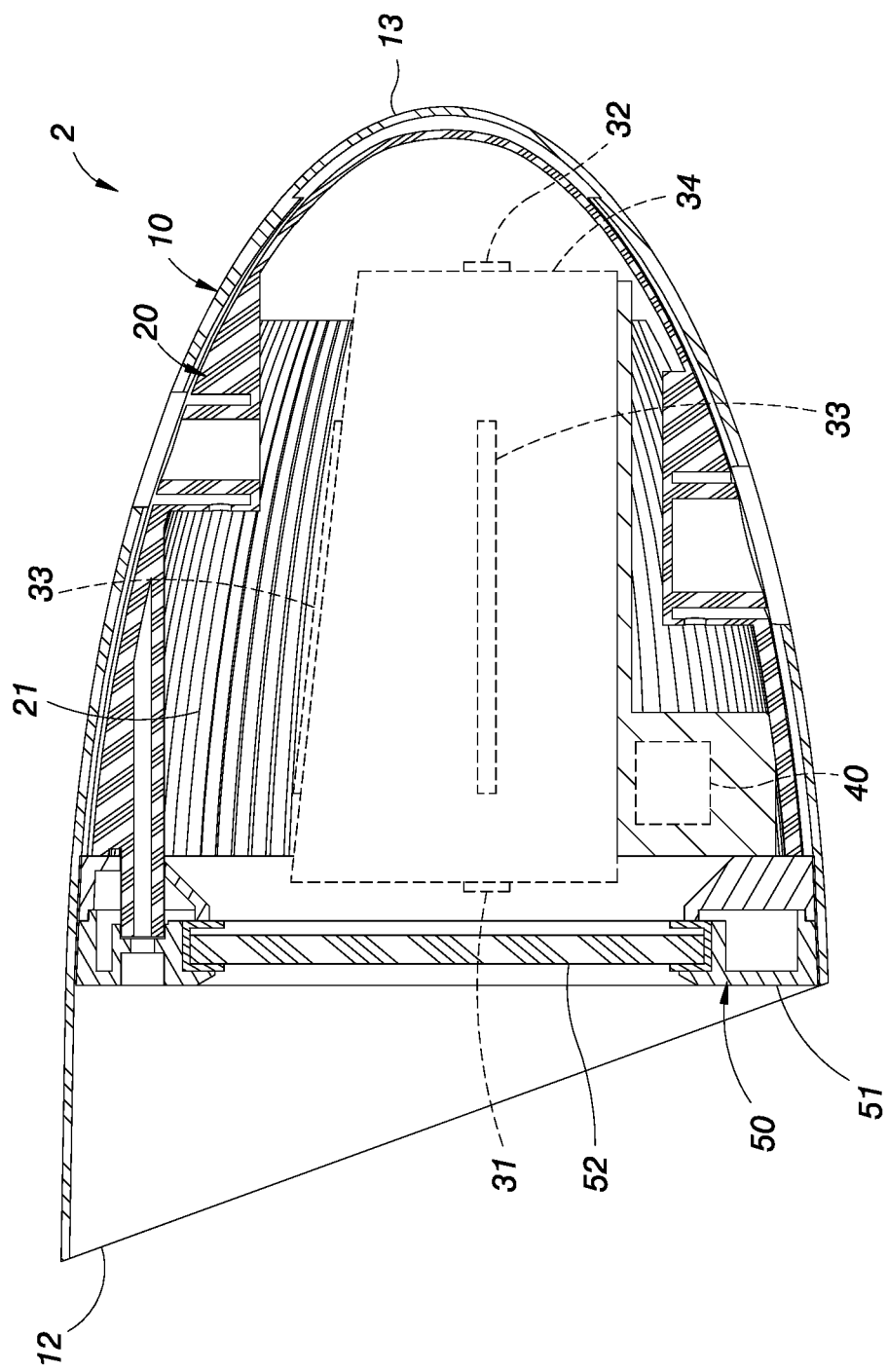
FIG. 3 is a schematic view of a lamp head in accordance with the first embodiment of this disclosure.
Figure 4:
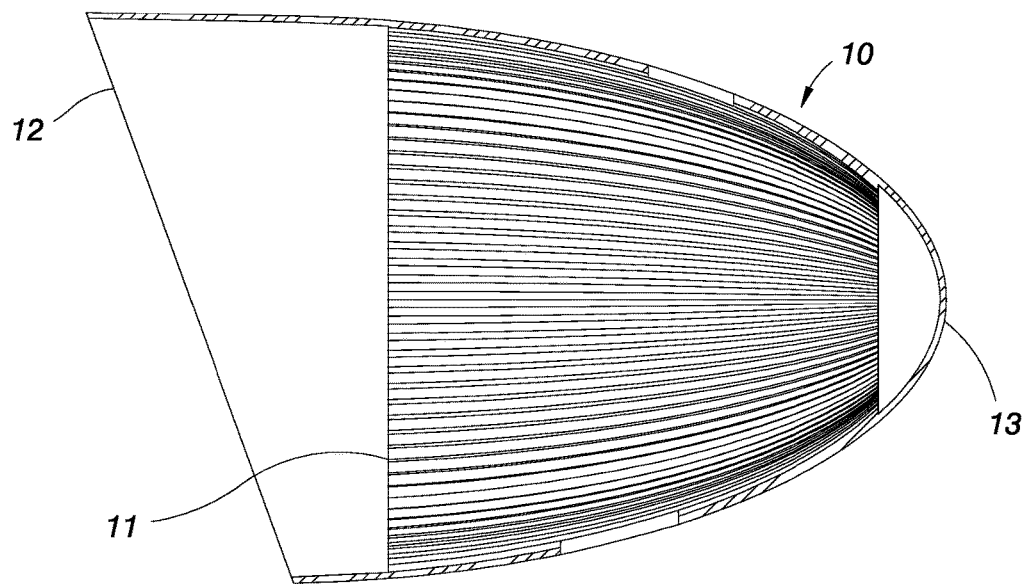
FIG. 4 is a schematic view of an outer lamp cover in accordance with the first embodiment of this disclosure.
Figure 5:
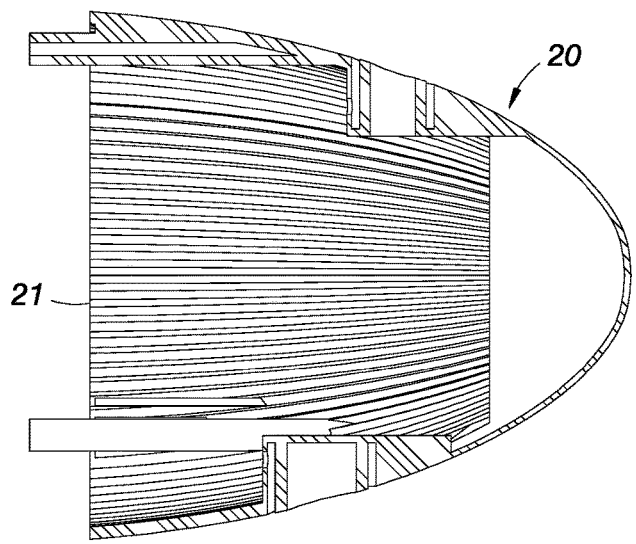
FIG. 5 is a schematic view of an inner lamp cover in accordance with the first embodiment of this disclosure.

In FIGS. 3 to 5, the front end of the outer lamp cover 10 has an opening to form a first translucent portion 12, and the rear end of the outer lamp cover is a second translucent portion 13, and the inner lamp cover 20 has a shape corresponding to the shape of the outer lamp cover 10, and the front end of the inner lamp cover 20 has a lens assembly 50 configured to be corresponsive to the inner periphery of the opening of the outer lamp cover 10. In an embodiment, the lens assembly 50 comprises a frame 51 fixed to the front end of the inner lamp cover 20 and a transparent optical lens 52 fixed to the inner periphery of the frame 51.

The first LED 31, second LED 32, and third LED 33 are installed in the inner lamp cover 20 and electrically coupled to a solar power supply module 3 (refer to FIG. 2 as well), and the first LED 31, second LED 32, and third LED 33 can be installed on a fixed lamp holder 34, wherein the first LED 31 is installed at the front end of the lamp holder 34, the second LED 32 is installed at the rear end of the lamp holder 34, and the third LED 33 is installed at the periphery of the lamp holder 34.

By the aforementioned structure, the light emitted from the first LED 31 can pass through the transparent optical lens 52 of the lens assembly 50 and the first translucent portion 12 and project towards the front of the lamp head 2. The light emitted from the second LED 32 can pass through the rear of the inner lamp cover 20 and the second translucent portion 13 and project towards the rear of the lamp head 2. The light emitted from the third LED 33 can pass through the light guide structure 21 of the inner lamp cover 20 and the light guide structure 11 of the outer lamp cover 10 and diverge to the surrounding of the lamp head 2.

Particularly, after the light emitted from the third LED 33 passes through the light guide structure 21 of the inner lamp cover 20 and the light guide structure 11 of the outer lamp cover 10, the surrounding of the lamp head 2 has a change of light color and a light divergence to achieve a brilliant lighting effect.

Figure 6:
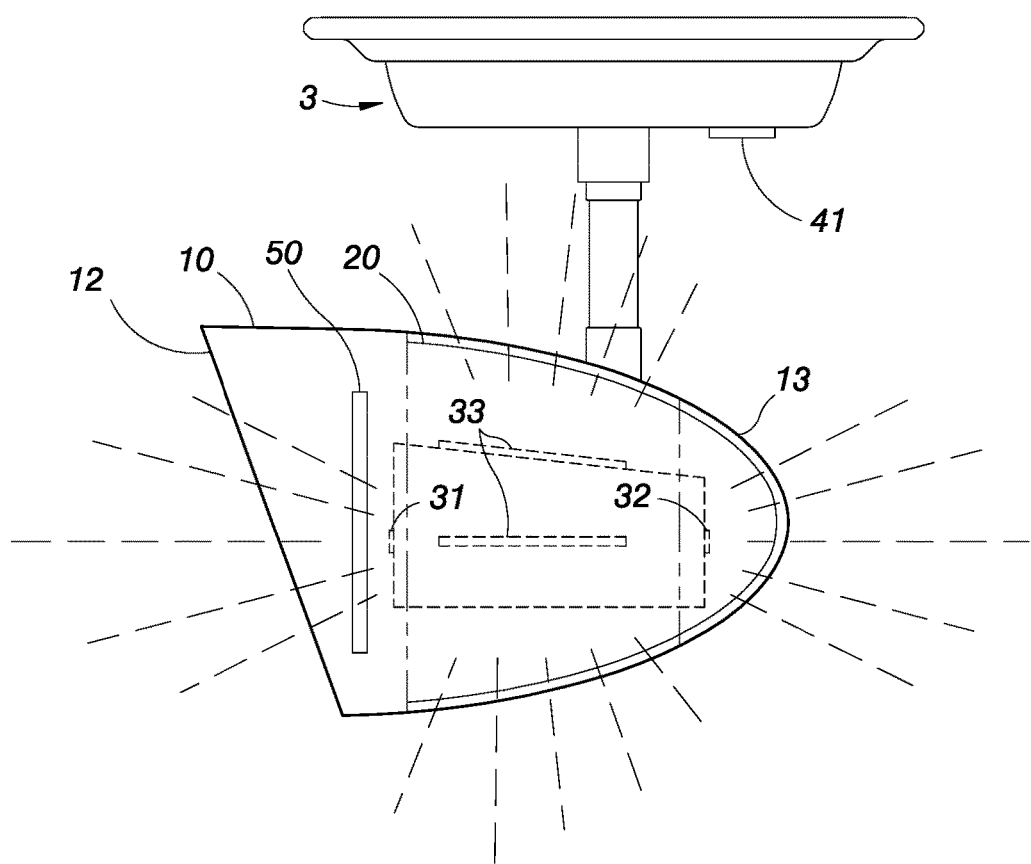
FIG. 6 is a schematic view of a lamp head emitting light towards the front, rear, and surrounding of a lamp head in accordance with the first embodiment of this disclosure.

The driver 40 comprises a switch 41 installed at the bottom of the solar power supply module 3 and the switch 41 is capable of controlling the first LED 31, second LED 32, and third LED 33 to emit light and/or change the light color simultaneously or separately to achieve the multidirectional lighting effect. FIG. 6 is a schematic view showing that the first LED 31, second LED 32, and third LED 33 emit light simultaneously.

Figure 2:
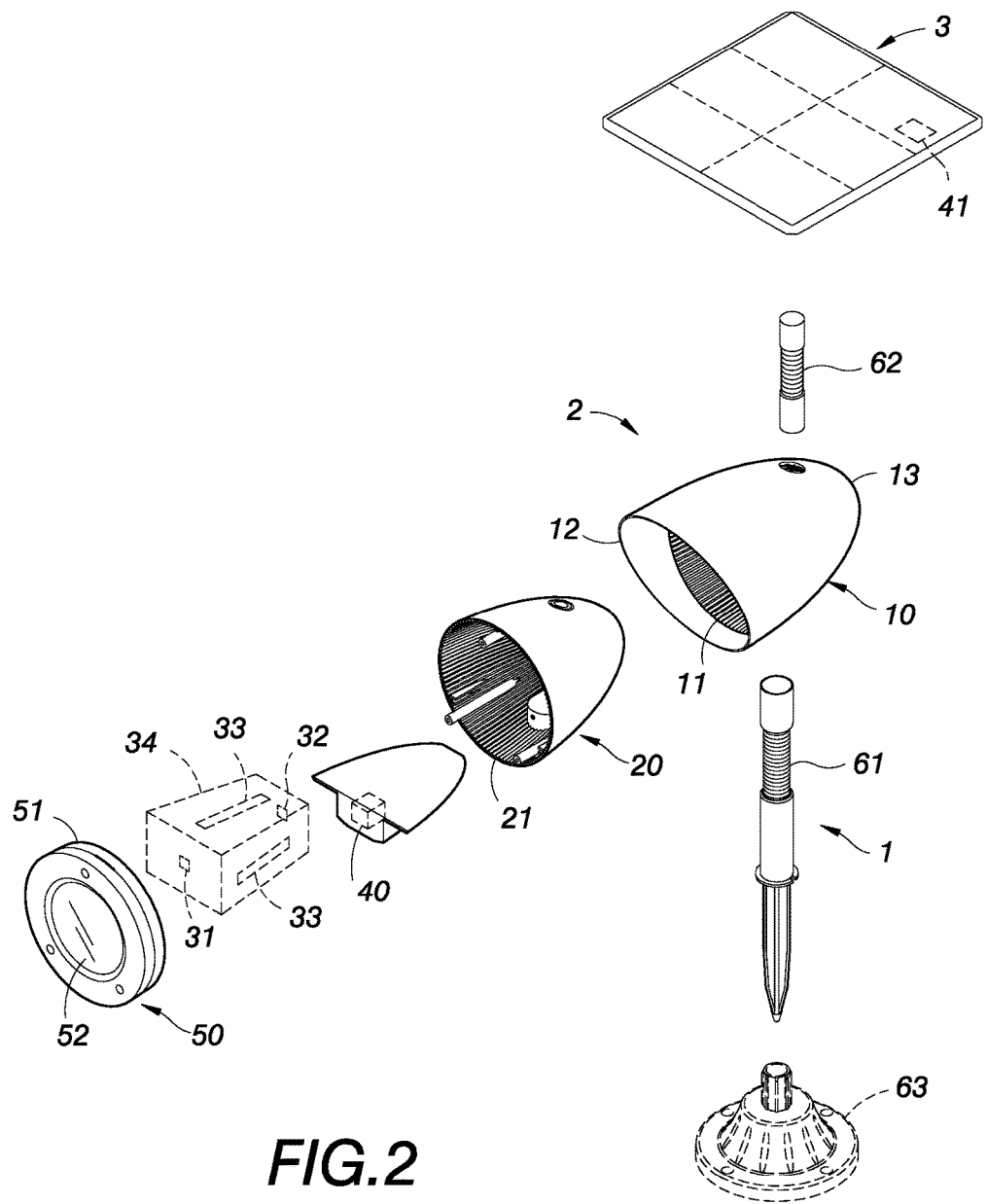
FIG. 2 is an exploded view in accordance with the first embodiment of this disclosure.

In FIG. 2, the support member 1 comprises a flexible lower support rod 61, and a flexible upper support rod 62, and the bottom of the flexible lower support rod 61 is fixed to a floor, and the top of the flexible lower support rod 61 is provided for fixing the bottom of the outer lamp cover 10. The bottom of the flexible upper support rod 62 is fixed to the top of the outer lamp cover 10, and the top of the flexible upper support rod 62 is provided for installing the solar power supply module 3.

In an embodiment, the interior of the flexible upper support rod 62 is in a hollow tubular shape and provided for passing a power cable of the solar power supply module 3 and then electrically connecting the first LED 31, second LED 32, and third LED 33. The bottom of the flexible lower support rod 61 is in the shape of a sharp cone to facilitate inserting the flexible lower support rod 61 into soil, or the bottom of the flexible lower support rod 61 is installed with a fixed base 63 to be placed or installed onto a concrete floor.

With the flexibility of the upper support rod and the lower support rod, the angle of the solar power supply module 3 with respect to the support member 1 can be adjusted, so that the solar power supply module 3 can have a better light collection effect. The lamp head 2 also can adjust a defection angle with respect to the support member 1 according to user requirements to improve the convenience of use.

With reference to FIGS. 7 to 14 for the second embodiment of this disclosure, the difference between the second embodiment and the first embodiment resides on that the second embodiment can adjust the position of the first LED 31, so that the focal length of the light emitted from the first LED 31 and passing through the lens assembly 50 can be changed. The implementation of the second embodiment is described in details below.

In FIGS. 7 to 10, the lens assembly 50 comprises a convex lens 53; and the first LED 31 is installed on a moving lamp holder 70, and the moving lamp holder 70 is driven to displace by an adjusting assembly 80, wherein the front end of the adjusting assembly 80 is disposed in the inner lamp cover 20, and the rear end of the adjusting assembly 80 extends and protrudes out from the rear of the inner lamp cover 20 and the outer lamp cover 10, and an adjusting knob 90 exposed from the outer lamp cover 10 is provided.

In an implementation, to cope with the configuration of the adjusting assembly 80, the rear end of the inner lamp cover 20 and the rear end of the outer lamp cover 10 have a through hole 22, 14 formed thereon respectively for passing the adjusting assembly 80.

When a user operates the adjusting knob 90, the adjusting knob 90 can rotate the adjusting assembly 80, so that the adjusting assembly 80 drives the first LED 31 installed on the moving lamp holder 70 to move forward and backward with respect to the convex lens 53, so that the focal length of the light emitted from the first LED 31 and passing through the convex lens 53 can be changed to achieve the light collection effect or the lighting effect with diverged projections.

Figure 7:
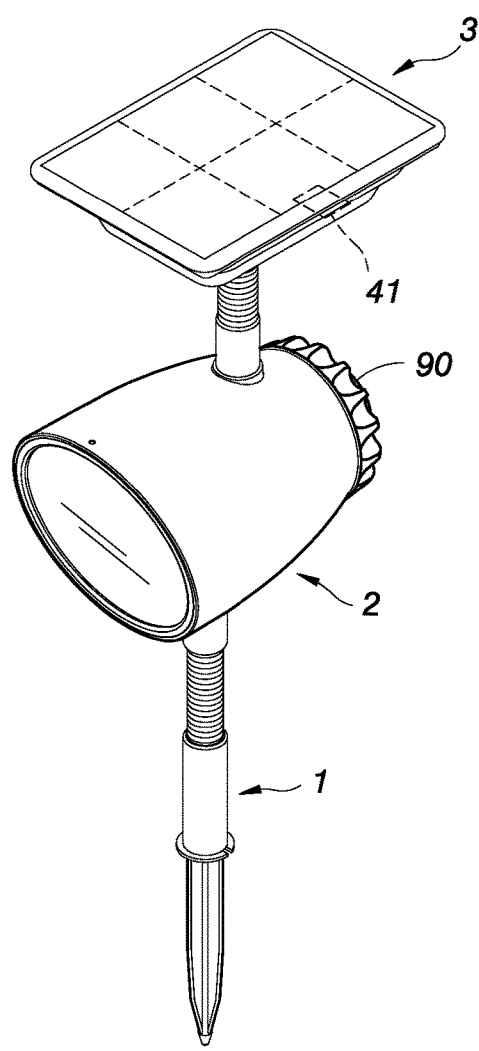
FIG. 7 is a perspective view of a second embodiment of this disclosure.
Figure 8:
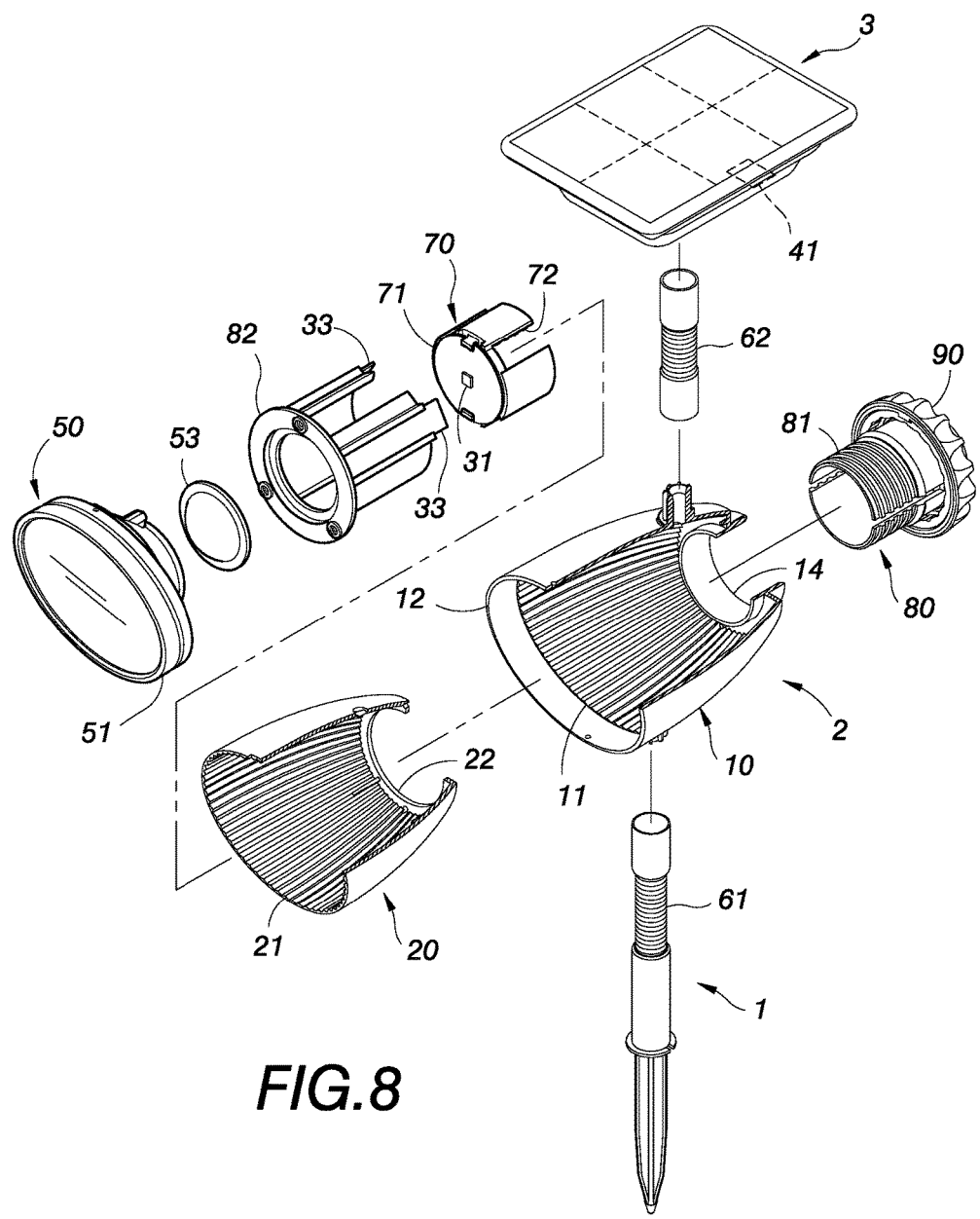
FIG. 8 is a partial exploded view of the second embodiment of this disclosure.

In an embodiment, the adjusting assembly 80 comprises a transparent hollow stub 81 screwed with the moving lamp holder 70, and a guide sleeve 82 for guiding the moving lamp holder 70 to move forward and backward. In FIGS. 7 and 8, the outer lamp cover 10, inner lamp cover 20, convex lens 53, and transparent hollow stub 81 are drawn to be non-transparent. In fact, they are made of a wholly transparent material.

The transparent hollow stub 81 in the inner lamp cover 20 is configured in the front-rear axial direction, and the front end of the transparent hollow stub 81 has an external thread, and the rear end of the transparent hollow stub 81 extends and protrudes from the rear of the inner lamp cover 20 and the outer lamp cover 10, and the second translucent portion 13 seals the rear end of the transparent hollow stub 81.

The moving lamp holder 70 has a light board 71, and a screw joint 72 extends backwardly from the periphery of the light board 71 and connects the front end of the transparent hollow stub 81 with a screw connection, and the front side of the light board 71 has the first LED 31, and the rear side of the light board 71 has the second LED 32, and the light emitted from the second LED 32 passes through the interior of the transparent hollow stub 81 and the second translucent portion 13 and projects towards the rear of the lamp head 2.

The guide sleeve 82 is fixed into the inner lamp cover 20 and disposed between the convex lens 53 and the moving lamp holder 70, and the guide sleeve 82 is sheathed onto the periphery of the moving lamp holder 70, and the third LED 33 is installed at the periphery of the guide sleeve 82.

Figure 9:
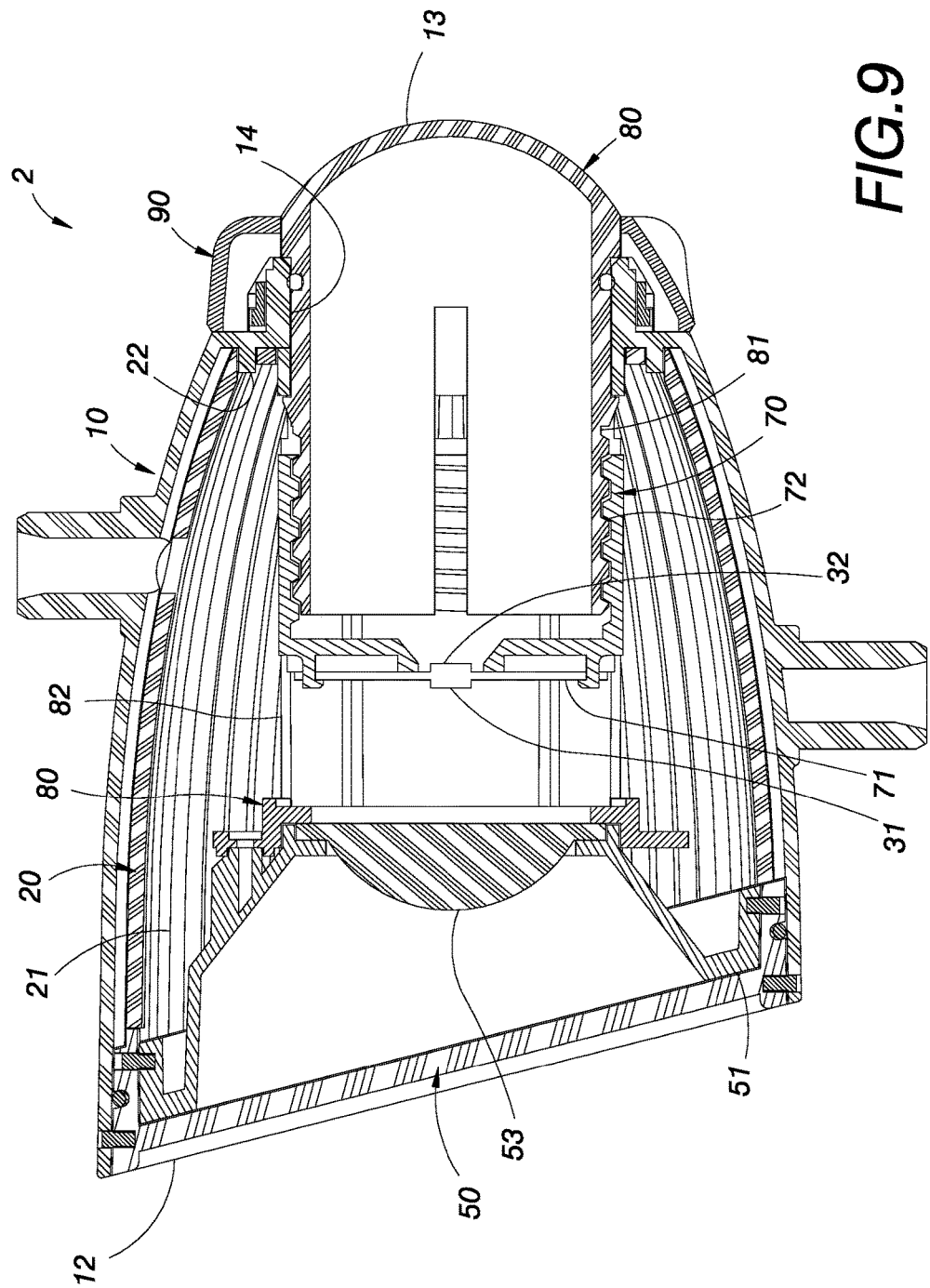
FIG. 9 is a schematic view of the second embodiment of this disclosure.
Figure 10:
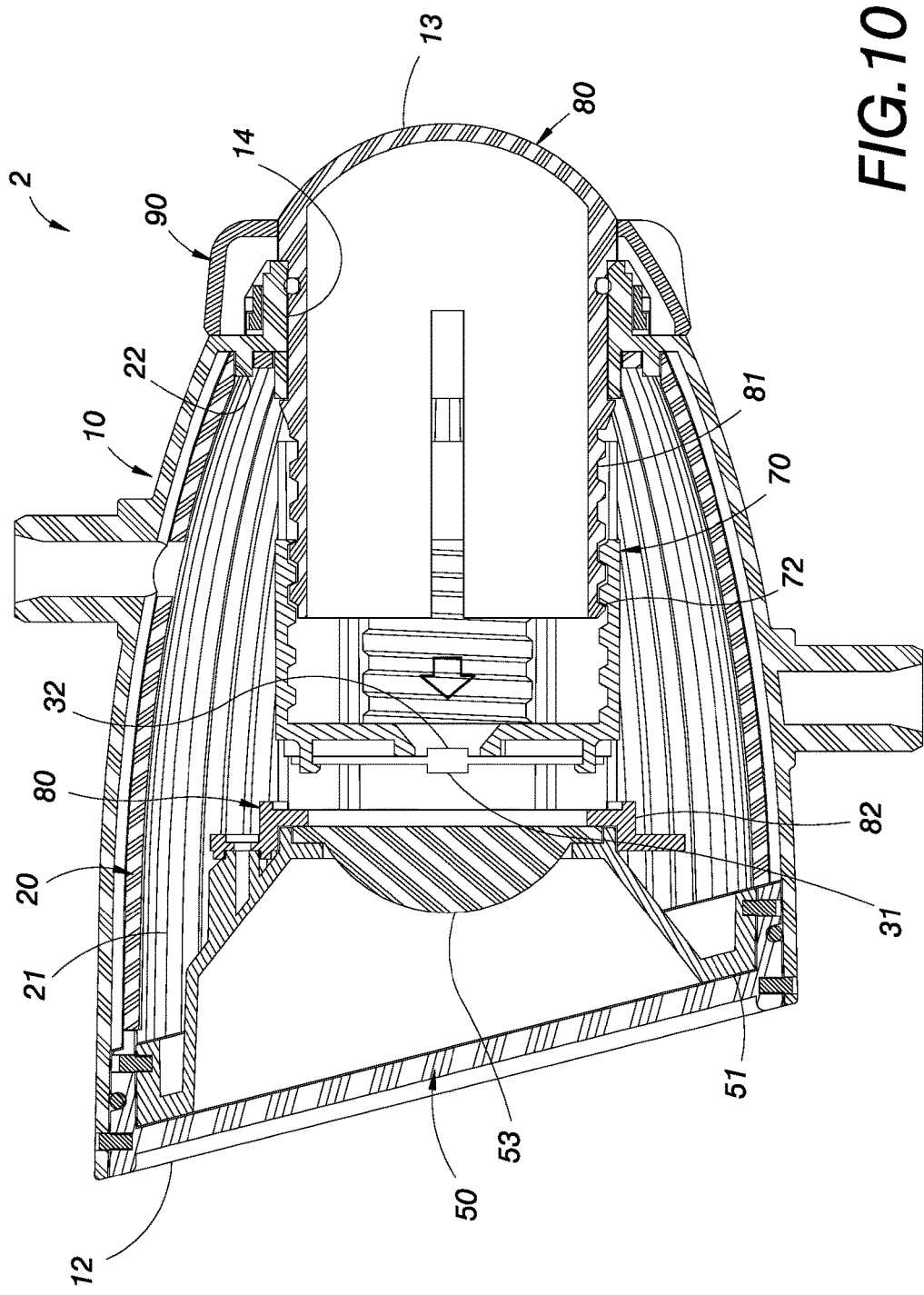
FIG. 10 is a schematic view of a first LED moving forward in accordance with the second embodiment of this disclosure.
Figure 11:
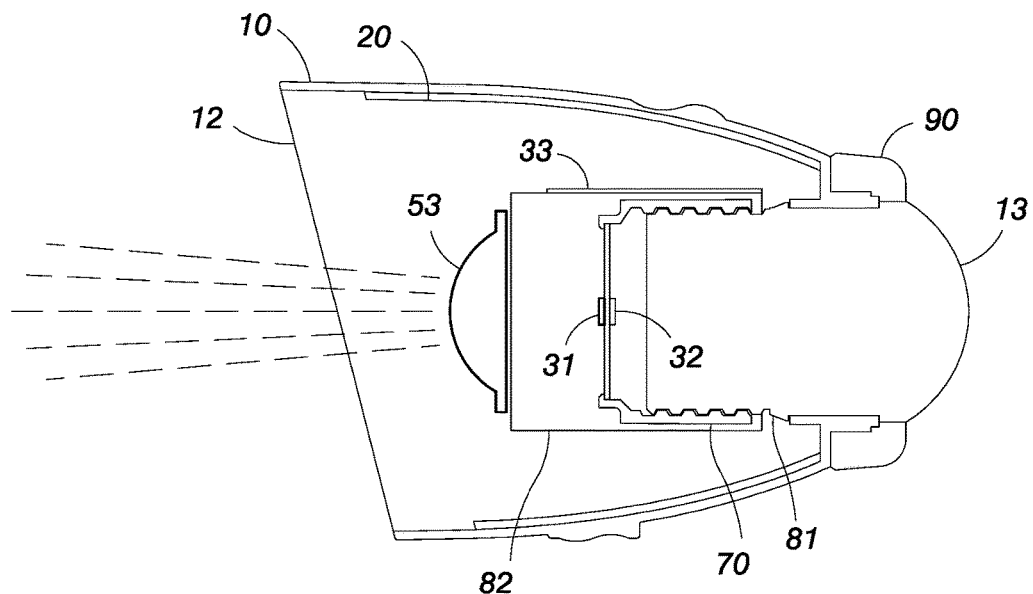
FIG. 11 is a schematic view of controlling a switch of a driver to drive a first LED to emit light in accordance with the first embodiment of this disclosure.
Figure 12:
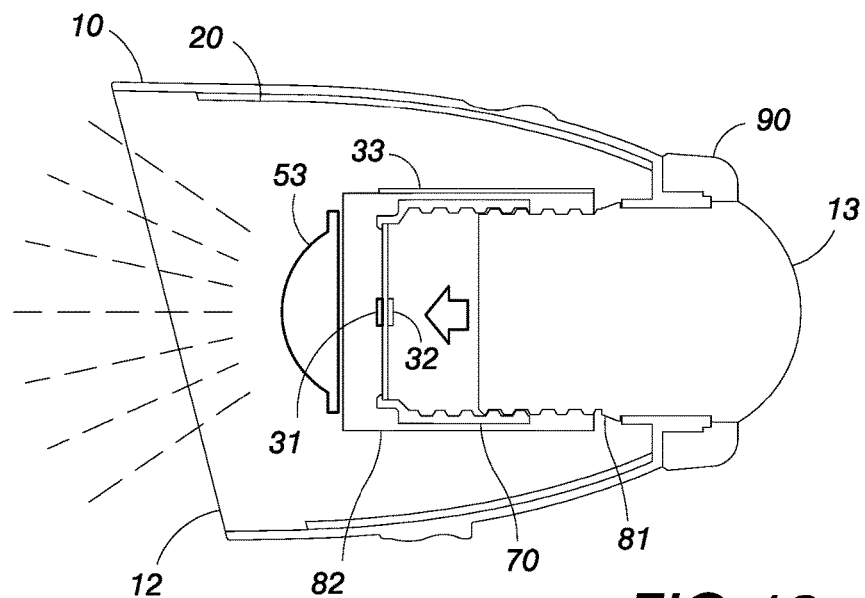
FIG. 12 is another schematic view of controlling a switch of a driver to drive a first LED to emit light in accordance with the first embodiment of this disclosure.

The adjusting knob 90 is sheathed on the periphery of the rear end of the transparent hollow stub 81 and capable of driving the transparent hollow stub 81 to rotate, so that the moving lamp holder 70 can move forward and backward with respect to the guide sleeve 82 after receiving the transmission from the transparent hollow stub 81 as shown in FIGS. 9 and 10, so as to adjust the distance between the first LED 31 on the moving lamp holder 70 and the convex lens 53 and achieve a concentrated projection effect of the light emitted from the first LED 31 and passing through the convex lens 53 as shown in FIG. 11, or a diverged lighting effect of the light emitted from the first LED 31 and passing through the convex lens 53 as shown in FIG. 12.

Figure 13:
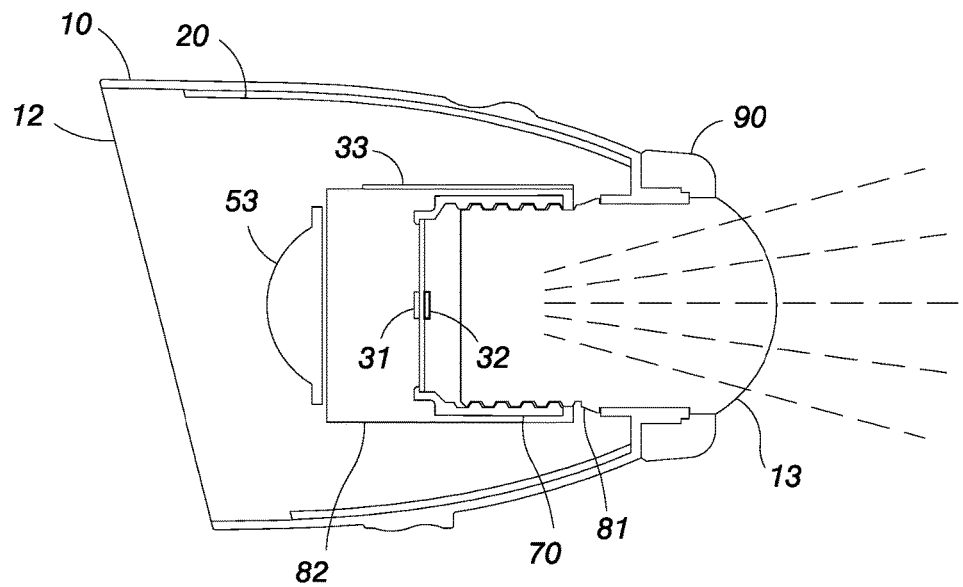
FIG. 13 is a schematic view of controlling a switch of a driver to drive a second LED to emit light in accordance with the second embodiment of this disclosure.
Figure 14:
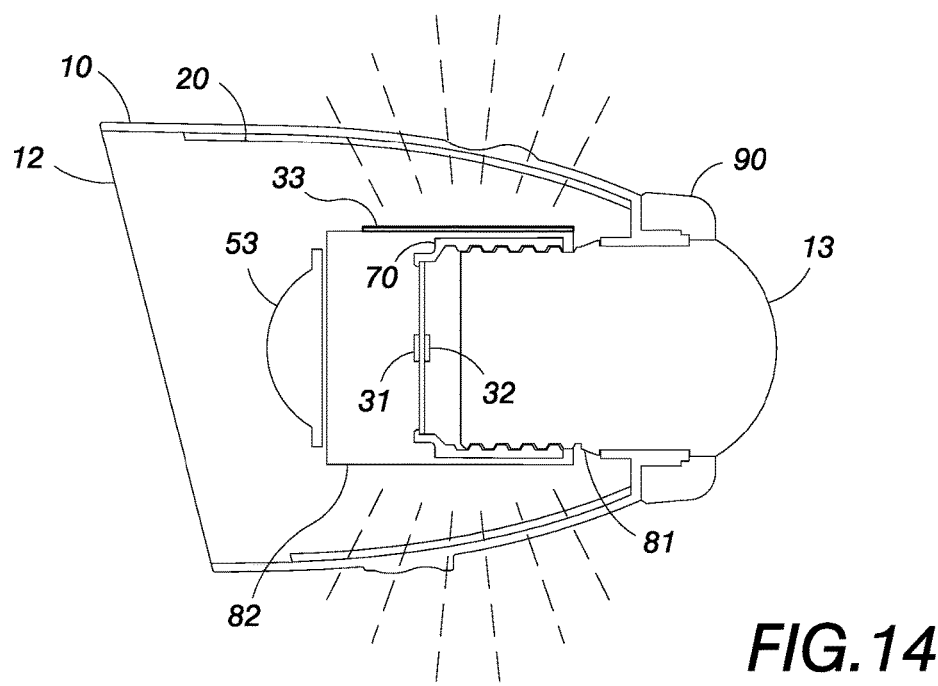
FIG. 14 is a schematic view of controlling a switch of a driver to drive a third LED to emit light in accordance with the second embodiment of this disclosure.

In addition, the switch of the driver in accordance with the second embodiment also can control the first LED 31, second LED 32, and third LED 33 simultaneously or separately to emit light and change light color. FIG. 13 shows that the switch controls the second LED 32 to emit light, so that the light can pass through the interior of the transparent hollow stub 81 and the second translucent portion 13 and project towards the rear of the lamp head. In FIG. 14, the switch controls the third LED 33 to emit light, and the light passing through the light guide structure of the inner lamp cover 20 and the light guide structure of the outer lamp cover 10 can be spread to the surrounding of the lamp head.

While this disclosure has been described by means of specific embodiments, numerous modifications and variations could be made thereto by those skilled in the art without departing from the scope and spirit of the disclosure set forth in the claims.

What is claimed is:

1. A solar garden light, comprising:
   a support member,
   a lamp head mounted on the support member and configured to project light towards a front, a rear, and a surrounding region of the lamp head, and
   a solar power supply module disposed above the lamp head, wherein the lamp head comprises:
   an outer lamp cover, and an inner lamp cover sheathed on an interior of the outer lamp cover, the outer lamp cover and inner lamp cover being made of a wholly translucent material, and having a light guide structure disposed at an inner periphery thereof;
   the outer lamp cover having an opening formed at a front end thereof to form a first translucent portion, and a rear end being a second translucent portion;
   the inner lamp cover having a shape corresponding to a shape of the outer lamp cover, and a front end of the inner lamp cover has a lens assembly configured to correspond to the inner periphery of the opening of the outer lamp cover; and
   first, second, and third LEDs being installed inside the inner lamp cover and electrically coupled to the solar power supply module, and light emitted from the first LED passes through the lens assembly and the first translucent portion and projects towards the front of the lamp head, and light emitted from the second LED passes through a rear end of the inner lamp cover and the second translucent portion projecting towards the rear of the lamp head, and light emitted from the third LED passes through the light guide structure of the inner lamp cover and the light guide structure of the outer lamp cover and is spread to the surrounding region of the lamp head, and the first, second, and third LEDs are electrically coupled to a driver, the driver controlling the first, second, and third LEDs to emit light simultaneously or separately.

2. The solar garden light of claim 1, wherein the light guide structure is a continuously jagged uneven surface.

3. The solar garden light of claim 1, wherein the lens assembly comprises a frame fixed to the front end of the inner lamp cover, and a transparent optical lens fixed to an inner periphery of the frame.

4. The solar garden light of claim 1, wherein the support member comprises a flexible lower support rod fixed to a floor, and the flexible lower support rod has a top provided for fixing a bottom of the outer lamp cover; and a flexible upper support rod fixed to a top of the outer lamp cover, and the flexible upper support rod has a top provided for installing the solar power supply module.

5. The solar garden light of claim 1, wherein the lamp head is capable of adjusting a deflection angle with respect to the support member.

6. The solar garden light of claim 1, wherein the driver comprises a switch installed at a bottom of the solar power supply module, and the switch is capable of driving the first, second, and third LEDs to change a light color simultaneously or separately.

7. The solar garden light of claim 1, wherein the lens assembly comprises a convex lens; the first LED is installed on a moving lamp holder, the moving lamp holder is driven to move by an adjusting assembly having a front end disposed inside the inner lamp cover and a rear end extending and protruding out from the rear of the inner lamp cover and the outer lamp cover, and an adjusting knob is exposed from the outer lamp cover and provided for a user to operate, and the adjusting knob is capable of rotating the adjusting assembly, so that the adjusting assembly drives the first LED disposed on the moving lamp holder to move forward and backward with respect to the convex lens, and a focal length of the light emitted from the first LED and passing through the convex lens can be changed.

8. The solar garden light of claim 7, wherein the adjusting assembly comprises a transparent hollow stub engaged with the moving lamp holder, and a guide sleeve for guiding the moving lamp holder to move forward and backward;

the transparent hollow stub is disposed inside the inner lamp cover and configured in a front-rear axial direction, and a front end of the transparent hollow stub has an external thread, and a rear end of the transparent hollow stub extends and protrudes from the rear of the inner lamp cover and the outer lamp cover, and the second translucent portion seals a rear end of the hollow stud;

the moving lamp holder has a light board, and a screw joint extending backwardly from a periphery of the light board and coupled to the front end of the hollow stud, and the first LED is installed on the front side of the solar garden light and the second LED is installed on a rear side of the light board, and the light of the second LED passes through an interior of the transparent hollow stub, and projected from the second translucent portion towards the rear of the lamp head;

the guide sleeve is fixed into the inner lamp cover and disposed between the convex lens and the moving lamp holder, and the guide sleeve is sheathed on a periphery of the moving lamp holder; and the adjusting knob is sheathed on a periphery of the hollow stud rear end and capable of driving the hollow stud to rotate, so that the moving lamp holder is urged by the hollow stud and moves forward and backward with respect to the guide sleeve to adjust a distance between the first LED and the convex lens disposed on the moving lamp holder.

9. The solar garden light of claim 8, wherein the guide sleeve has the third LED installed at a periphery thereof.

10. The solar garden light of claim 8, wherein the inner lamp cover and outer lamp cover each have a through hole formed at their respective rear ends configured for passing the hollow stud out from the through hole.

* * * * *